United States Patent Office 3,336,235
Patented Aug. 15, 1967

3,336,235
PROCESS FOR MAKING ORGANO-COATED
SILICA AND ORGANOSOLS THEREOF
Morris Mindick, Chicago, and Thomas C. Curtis, Country Club Hills, Ill., assignors to Nalco Chemical Company, Chicago, Ill., a corporation of Delaware
No Drawing. Filed Jan. 28, 1963, Ser. No. 254,417
16 Claims. (Cl. 252—309)

This invention relates to a method of providing surface-esterified colloidal silica particles. More specifically, the instant invention is concerned with a method of making surface-esterified silica particles which may exist in sol form in organic solvents, or as solid surface-coated particles.

U.S. Patent 2,801,185 is concerned with silica organosols which may be suitably dried to solid products and again redispersed to form sols in the same or other organic medium. The hydrophobic products have a wide range of use as additives in a variety of organic solvents, resins, plastics, etc. However, the disclosed method of arriving at these hydrophobic products has certain deficiencies and drawbacks which make it somewhat unsuitable for use in their production. Particularly, it has been found that during the process itself, in following the general techniques outlined by the patentee, a certain amount of product and/or precursor intermediates to the final product have a tendency to precipitate out of the particular continuous phase in which they are colloidally dispersed. For example, in the critical surface-esterification step itself, it has been noted that as much as 25% or more of the esterified product or partially esterified product gels or precipitates from the organic medium in which the reaction is taking place. This loss of product or partially reacted product tends to reduce the process efficiency in that full utilization of the reactant silica particles is not realized. In addition to this costly loss of product, the process itself becomes difficult to carry out in that precipitant must be removed continuously, and/or the process stopped in the middle of any particular run and the gel removed. The disclosed process has a particular tendency to complication when relatively high concentrated runs are desired, that is, when reaction sols containing relatively high amounts of colloidally dispersed silica particles are used as starting materials. In such a case gross precipitation and/or gelation occurs and the conversion yields are especially low.

It would be advantageous to the art if a process could be devised whereby relatively high concentrated silica sols could be employed as reactants in preparing hydrophobic coated silica particles, and particularly surface esterified silica particles which are, nevertheless, redispersible in organic solvents. It would be a further advantage if this process could be carried out whereby both surface-esterified silica particles in solid form could be produced for immediate use, or, via the same overall process, the surface-esterified silica particles could be directly used as sol additives without further processing the final products of the reaction. In other words, such a process would have versatility in that the produced surface-esterified silica could be utilized directly as a sol which remains stable over long periods of time prior to actual additive use, or as a solid product envisioning no solvent diluents. Use of the latter material has particular advantage when used as an additive in various processes which have little or no solvent tolerance. Also such a dry product is desired in order to minimize shipping and handling costs.

It would be a further advantage to the art if the process were capable of producing these same dry particles without any evidence of product loss, gelation, precipitation, or other process deficiencies, and yet, the dry particles could be again redispersed in a host of solvents varying materially in their chemical make-up and configuration. Such a process would find ready acceptance in the art since full utilization of the somewhat costly starting unmodified silica sols would be realized, as well as advantages of no process interruption, no separate step of separating out undesirable "seed" precipitants, no interference with process equipment through undesirable gelation, etc.

It, therefore, becomes an object of the invention to provide a new method of producing surface-esterified colloidal silica particles in a dry or sol form.

A special object of the invention is to provide an improved method of preparing surface-esterified colloidal silicas which are organic dispersible, which process has the distinct advantage of full utilization of starting material without chance of uneconomical precipitation or gelation.

In accordance with the invention, it has been discovered that hydrophobic, organic dispersible surface-esterified colloidal silica particles may be suitably produced without chance of reactant or product loss through precipitation. In its broadest aspects, the invention comprises a method of providing such modified colloidal silica particles in sol or solid form by first providing a silica organosol containing unmodified colloidal silica particles as the dispersed phase and a water-miscible alcohol as the continuous phase. This sol is then heated in the presence of an aliphatic water-immiscible monohydric alcohol containing at least four carbon atoms and preferably in the presence of an organic hydrophobic co-solvent having a boiling point greater than 200° C. The former alcohol is in reality the esterification agent, while the latter reagent acts in a surprising manner to prevent any reactant or intermediate or final product loss during such a process and particularly during the critical esterification step. After the initial step of the process at least 50% by weight of the water-miscible alcohol is removed by heating. Upon further heating at relatively high temperatures, the silica particles are then esterified by the water- immiscible alcohol. This step must be carried out in the presence of the above co-solvent which acts as a protective process reagent. The final surface-esterified product exists in sol form with unreacted water-immiscible alcohol as the continuous phase along with the co-solvent. The sol has been found to be an excellent additive reagent itself, and needs no further processing. This sol is stable for long periods of storage time, and may be used exactly as provided to beneficiate organic hydrophobic environments for a variety of uses. In an alternate embodiment, it has been discovered that the process is also eminently suited to production of solid surface modified silica particles by easy and efficient precipitation or other means of removal of the dispersed surface modified silica particles from the continuous liquid phase. These steps comprising the invention are discussed in more detailed outline as follows.

The starting organosol reactants containing unmodified silica particles colloidally dispersed in a water-miscible alcohol are well-known in the art and need little elaboration. Generally, an aqueous colloidal silica sol is prepared, as for example, according to the process disclosed in U.S. Patent 2,574,902. A water-miscible alcohol is then exchanged for the aqueous continuous phase in order to produce stable alcohol sols. A suitable method for production of such alcosols is also described in White U.S. Patent 2,375,738 and Marshall U.S. Patent 2,285,449. Preferred organosols are those which are spoken of as "salt-free." These are prepared by generally deionizing the aqueous sols with a cation exchange resin in the hydrogen form and a strong base anion exchange resin in the hydroxide form. These aqueous deionized sols and likewise the subsequently formed alcosols have an extremely low salt content expressed as Na$_2$SO$_4$, of less than 0.01%. The alcosols are generally simply prepared by adding the water-miscible alcohol to the aqueous colloidal silica sol and removing the water therefrom by distillation or other means.

The continuous phase or alcohol may be chosen from among ethanol, normal propanol, tertiary butyl alcohol, isopropanol, water-miscible "Cellosolves" such as 2-methoxy ethanol, 2-ethoxy ethanol, 2-propoxy ethanol, and 2-butoxy ethanol, and "Carbitols" such as ethyl "Carbitol," etc. Preferred among these are the "Cellosolve" alcohols, or glycol ethers.

The starting organo silica sols may contain as high as 50% by weight of colloidally dispersed unmodified silica particles or may even have a silica content as low as 5% by weight, and still be useful in the process. More preferred materials contain from 15% to 40% by weight of silica dispersed phase. A typical sol may contain 35% by weight of silica colloidally dispersed in 2-ethoxy ethanol.

To the above type organosol used as a starting reactant is then added an aliphatic monohydric alcohol, linear or branched, unsaturated or saturated, containing at least four carbon atoms. This water-immiscible alcohol is subsequently used as the surface-esterification agent. Along with this material is preferably added an organic, hydrophobic, co-solvent having a boiling point greater than 200° C. The latter material need not necessarily be added in the initial step of removal of water-miscible alcohol but has been found to be essential in maintaining the silica particles during the critical high temperature esterification step in the desired colloidal state. Further, the co-solvent helps to inhibit any formation of undesired siloxane bonding causing precipitation and/or gelation.

The esterifying alcoholic agent may be chosen from a variety of materials. Preferred are those aliphatic alcohols having a range of carbon atoms from 4 to 16. Among the preferred monohydric alcohols of this type are n-butyl, n-hexyl, n-heptyl, n-octyl, n-nonyl, n-decyl, n-undecyl, n-dodecyl, n-tetradecyl, n-hexadecyl, and n-octadecyl, etc. The corresponding unsaturated derivatives may also be employed, and in either case the alcohols may be either linear or branched in their configuration.

The high-boiling organic co-solvents may also be chosen from a host of suitable materials. Among those preferred are esters, high boiling ethers, such as dibutyl carbitol, hydro-carbons, halogenated hydrocarbons, such as chlorinated hydro-carbons, aromatics, petroleum solvents such as kerosene, substituted benzenes, high molecular weight tertiary amides such as the amide of oleic acid and diethyl amine, etc. Preferred co-solvents are high molecular weight esters such as octyl octanoate, decyl decanoate, etc. The high molecular weight co-solvent has an additional role in that it affords an opportunity to obtain almost completely esterified final silica products, since the reaction, in contradistinction to prior art, may be carried out at relatively high temperatures without chance of interfering precipitation. In addition, the high boiling co-solvent, when used in conjunction with the water-immiscible monohydric surface-esterifying agents helps to raise the boiling point of the more volatile alcohols and thereby provides an opportunity for higher temperature esterification reaction. The co-solvent itself should contain no reactive groups which may interfere with the process by causing side-reactions. More preferred co-solvents have boiling points in excess of 220° C.

One excellent source of esterifying alcohol which may be used is that class of compounds known as oxo alcohols. These are normally a mixture of various intermediate molecular weight alcohols ranging from 4 to about 16 carbon atoms. Their preparation and description is described in the book "Higher Oxo Alcohols," by L. F. Hatch, Enjay Company, Inc., 1957, which disclosure is here incorporated by reference. An additional advantage in the use of the above oxo alcohols is that, as impurities with the alcohols in the still bottom, are found beneficial co-solvent type substances. Thus, as a single composition, the oxo alcohol still bottoms contain both esterifying agent and co-solvent, and through a single addition to the organosol starting materials, both esterifying reactant and protective co-solvent are introduced into the reaction system. The particular co-solvents found in the oxo alcohol still bottoms normally consist of esters of the same alcohols such as nonyl octanoate, nonyl decanoate, decyl octanoate, octyl octanoate, decyl decanoate, nonyl nonanoate, etc. The general range of both esterifying alcohols and co-solvents, and particularly esters, typifying an oxo alcohol still bottom of the type which may be used in the invention, is as follows:

| Ingredients: | Percent |
| --- | --- |
| Octyl alcohol | 2–20 |
| Nonyl alcohol | 5–40 |
| Decyl and higher alcohols | 25–90 |
| Esters | 20–80 |

A typical oxo alcohol still bottom which finds excellent use in preparing the surface-esterified coated silica particles of the invention has the following composition.

| Ingredients: | Weight percent |
| --- | --- |
| Octyl alcohol | 5 |
| Nonyl alcohol | 10 |
| Decyl and higher alcohols | 35 |
| Esters | 45 |
| Soaps | 5 |

The first step in the operation, that is, replacement of at least 50% by weight of the original continuous alcoholic phase containing the unmodified silica particles may be carried out by a variety of means. In one, the co-solvent may be added and the water-miscible alcohol then distilled out at elevated temperatures. During this distillation, a portion of the esterification agent is slowly added while the water-miscible alcohol is removed by distillation or other means.

In another embodiment, the esterifying alcohol may be added initially along with a portion of the co-solvent. An additional amount of co-solvent may be then slowly added in incremental amounts during removal of the water-miscible alcohol. Likewise, all of the water-immiscible alcohol may be added prior to the initial heating step and the co-solvent then added at its completion.

By far the most preferred method is one in which a mixture of water-immiscible alcohol and co-solvent is first made. This mixture may be then added to the organosol in one addition at the beginning of the reaction, or it may be added incrementally throughout the removal of the water-miscible alcohol. Likewise, a portion of the mixture may be first added to the alcohol sol and incremental additions introduced thereafter during removal of the continuous phase of the original alcohol sol. After the mixture of co-solvent and esterifying agent has been added to the alcohol sol, the solids content of the unmodified silica particles preferably ranges from 10 to 40% by weight. More preferred materials contain from 20 to 40% by weight of silica solid. In a typical run, an organosol containing 35% by weight of silica was diluted with sufficient water-immiscible alcohol and co-solvent to yield a 25 weight percent silica reaction material.

When a mixture of co-solvent and esterifying agent are employed it has been determined that at least 15% by weight of this mixture must be made up with co-solvent. When less is used, chances of precipitation are measurably increased. A preferred amount of co-solvent such as esters, etc. in the mixture is within the range of 15% to 50% by weight. Greater amounts of co-solvent in the mixture cause poorer esterification reactions. Although the reaction may nevertheless be carried out, longer process times in the actual esterification step are necessary.

In any of the above modifications comprising the first step of the reaction, it is greatly preferred that just prior to the second step or esterification step itself, the water-miscible alcohol be removed to the extent of at least 50% by weight based on its original content. In many cases, at least 90% by weight of the continuous water-miscible phase of the original alcohol sol is removed. Likewise, just prior to the esterification step effected at relatively high temperatures, the amount of co-solvent in relation to the esterifying agent should be at least 15% based on the weight of the two ingredients in their combined form. As shown above, of course, the methods of introducing these two materials prior to esterification itself may be varied widely.

The removal of the original water-miscible alcohol may be carried out at the temperatures ranging from 50° C. to about 190° C. More preferably, the solvent removal is carried out at temperatures from 80° C. to about 190° C. The solvent removal generally lasts for a period of time ranging from 1 to 12 hours, and preferably lasts from 1½ to 10 hours. During this step, some minimum amount of esterification may take place, but this in no way affects the final product or the process of making same.

While generally it is preferred to have replaced all of the weight of the removed water-miscible alcohol with at least an equal amount of esterifying agent and co-solvent, such is not absolutely critical. However, for best results it has been found that at least a 10% by weight silica sol remains at the end of this alcohol removal. Sols containing as high as 40% by weight of silica during this step in the reaction may be further employed without fear of deleterious results in subsequent process steps.

The next step in the reaction is the esterification step itself. It is essential that the co-solvent be present in this step to prevent process difficulties and silica precipitation and gelation. The esterification reaction is carried out at temperatures ranging from 190° C. to 275° C. over a period of time ranging from 2 to 8 hours. More preferably, the esterification reaction is carried out at temperatures ranging from 190° C. to 250° C., and in times ranging from 2½ to 5 hours. During this step, as mentioned above, at least 15% by weight of co-solvent must be present as a protective agent. This weight is based on the total amount of co-solvent and water immiscible alcohol present during the esterification reaction. If necessary, additional esterifying agent and co-solvent may be added during this esterification reaction step.

In another preferred embodiment, the now modified silica sol may be concentrated by such methods as vacuum distillation. This distillation is carried out at temperatures ranging from 120° C. to 275° C. and generally take from ½ to 4 hours. Examples of sols containing surface esterified silica particles have been prepared which contain 60% or even more of silica, expressed as $SiO_2$. The preferred products are those containing from 25% to 65% by weight of silica.

In yet another preferred embodiment, the surface-esterified silica is recovered from the reaction mixture as a solid directly usable product. This product may be used as such in its various additive roles, or if desired may be subsequently converted back again into sol form by addition to the requisite hydrophobic organic solvent. The methods of separation of solid from continuous phase may be carried out in a variety of ways such as precipitation, freeze drying, etc. By far, the most preferred method of separating out the solid phase from a liquid phase is effected by addition of an alkyl water-miscible alcohol to the now hydrophobic sol. Preferred alcohols are lower alkyl alcohols generally containing less than 4 carbon atoms. Among these, methanol, ethanol, isopropanol, n-propanol, etc., are preferred. Methanol is most preferred in that excellent solid product yields are obtained in a minimum process time. Generally, at least an equal weight of lower alkyl alcohol must be added to the sol product based on its weight. For best results, and in order to obtain excellent product recovery, at least 2–3 times the weight of lower alkyl alcohol based on product sol weight is added. In this regard, it was discovered that esters were particularly preferred co-solvents in that subsequent product precipitation could be carried out in a cleaner, more efficient manner than when other co-solvents were present. For example, use of kerosene as a co-solvent, while suitably maintaining the reacting silica particles in sol form, nevertheless made it somewhat difficult to obtain the desired solid silica precipitant quickly and efficiently. Particularly, some loss in product yield was noted, and copious quantities of lower alkyl alcohol were necessarily added before the solid product could be obtained in good yields.

It is believed that the product sols and solid modified silica powders therefrom are unique when one employs an oxo alcohol still bottom as a reactant. As mentioned above, the oxo alcohol still bottom in a single composition has the necessary co-solvent and esterifying alcohol components. In addition, due to the nature and variety of various alcohols going to make up this mixture of oxo alcohols, the silica particles themselves are modified with a wide variety of alcoholic molecules that differ widely in their molecular weight, configuration, surface modifying properties, etc. Thus, use of such an alcohol provides a product having its silanol groups esterified with widely varying hydrocarbon substituents. This appears to allow in turn incorporation into a wide number of hydrophobic solvents, materially varying in their make-up. Prior art organic coated silica particles do not have this versatility of solubilization.

When one employs oxo alcohol still bottoms as the esterifying agent the silica particles are thus surface-esterified with a variety of varying alcohols. Preferred solid silica products have their silanol groups esterified with the following range of reactive alcohols contained in the oxo bottoms.

| Ingredient: | Weight percent |
|---|---|
| Octyl alcohol | 2–20 |
| Nonyl alcohol | 5–40 |
| Decyl and higher alcohols | 25–90 |

Likewise, when the desired product is in sol form, the sol contains as a dispersed phase, silica particles surface-esterified with the above range of alcohols. The continuous liquid phase of the sol is primarily composed of the organic co-solvent ester used as a protective reagent in the reaction itself. Other liquids present are generally unreacted higher alcohols such as tridecyl alcohol, etc. At least 50% of the liquid phase and more preferably 80% is composed of ester.

The following examples illustrate typical methods of preparing both solid esterified silica powders and their precursor sols. It is understood, of course, that these examples are illustrative, and that the invention is not limited thereto.

EXAMPLE I

This first example illustrates the critical necessity of employment of an organic hydrophobic co-solvent during the process, without which the process cannot be carried out to its full efficiency and product yield.

Into a one liter, three-necked round bottom glass, equipped with stirring device, heating mantle, thermometer and a dropping funnel, was added 350 grams of a "Cellosolve" sol containing 35.5% silica colloidally dispersed in 2-ethoxy ethanol. To this was added 58.5 grams of mixed isomers of decyl alcohol. The distillation of "Cellosolve" was then begun. During the replacement of "Cellosolve," 275 grams of additional decyl alcohol were added by means of the dropping funnel in incremental additions. A relatively constant volume in the flask was thereby maintained. During the replacement process, the temperature of the liquid rose from an initial temperature of 132½° C. to 190° C. over a period of three hours and 18 minutes. The temperature was then raised for purpose of esterification. At 212° C., it was noted that a deposit was forming on the bottom of the flask. Further heating to effect complete esterification resulted in additional precipitate and the reaction was discontinued at this time. The liquid sol and silica precipitate were separated and to 250 ml. of liquid was added 150 ml. methanol in order to precipitate out the solid esterified silica. After filtering and exhaustive washings with methanol, the silica was air-dried overnight. The dried silica, while redispersible as a true sol in some solvents such as hexane, was not redispersible in others such as the decyl alcohols from which its was prepared. Thus, without use of co-solvent not only is the process inefficient in that large amounts of product or unreacted silica are lost, but also the final product itself is somewhat deficient in that it can be redissolved in only a few organic systems. This tends to measurably decrease the effectiveness of the solid modified silica powders. It is believed that such lack of solubilization in some solvents is due to incomplete esterification.

EXAMPLE II

This example is illustrative of a typical preparation of a product sol by specifically following the various steps in the invention generally outlined above. 2650 pounds of a "Cellosolve" sol (2-ethoxy ethanol), containing 34.5% silica by weight (as $SiO_2$) were charged to a large tank. This alcosol was then diluted to approximately 25% silica with 114 pounds of oxo alcohol still bottoms, having approximately the composition of the oxo alcohol bottoms specifically described above. The pH of the resultant mixture was 3.0. The reaction mixture was then heated as rapidly as possible to 150° C. using high pressure steam and three electric heaters. When the temperature of the reaction had reached 147° C., the distillate was collected at a head temperature of 124° C. The high pressure steam and electrical heaters were employed at full capacity to control the reaction temperature rise at 0.2° C. per minute. During this collection of distillate, the same oxo alcohol was incrementally added to maintain a constant volume. During the total time of replacement, 1586 additional pounds of oxo alcohol were added. After all the oxo alcohol had been added to replace the original amount of "Cellosolve," the high pressure steam was turned off and the electric heaters were used to heat the reaction mixture to an esterification temperature beginning at 200° C. This latter step was carried out over a period of 3 hours, and the electric heaters were employed at full capacity to give a 50° C. temperature rise during this time. After completion of the esterification step, the electric heaters were turned off and vacuum was slowly applied at a rate sufficient to avoid excess foaming. A full vacuum of 29½ inches mercury was able to be attained, and the liquid sol product was thereby concentrated from an original 29% silica to 55% silica. When a specific gravity reading indicated that the latter concentration had been reached, the vacuum was broken. The reaction temperature during this concentration step under vacuum dropped from 250° C. to 170° C. Then the batch was cooled to 120° C. and filtered in one pass through an E-13 R 10 sock cartridge to remove all of the relatively large particles. The filtered sol liquid was then cooled to room temperature and drummed for storage. The sol itself was composed of the esterified silica as the dispersed phase and the ester co-solvent and higher unreacted alcohols such as tridecyl alcohol as the continuous phase. The ester component was by far the dominant component, comprising approximately 45% or more of the liquid phase.

EXAMPLE III

This example illustrates the ease of preparing solid surface-esterified silica particles directly from the sol product itself with a minimum of processing. One part of the liquid sol product, as synthesized above, was added slowly to approximately three parts by weight of methanol with agitation at room temperature in a Dopp kettle. During addition, a white precipitate was formed. After the sol product had been added, stirring was continued for an additional 10–15 minutes. Agitation was stopped and the precipitate allowed to settle for 1 to 1½ hours. The supernatant liquid contained methanol and excess oxo alcohol still bottoms primarily composed of ester co-solvent was decanted, leaving a heavy slurry of approximately 40% solids and 60% liquids. This slurry was fed to a vacuum type drum filter and the wet solids (65% solids, 35% moisture) were recovered at a rate of 50 lbs./ sq. ft./hr. The wet cake was placed in trays and dried in a gravity feed oven at 150–170° F. The time required to dry this product to 0.5% volatiles was approximately 10–15 hours. The product was then ground and packaged for use.

The products as produced via the techniques outlined above may be used in a variety of additive treatments such as to impart anti-skid properties to various organic compounds such as waxes, thermoplastic polymers, copolymers, etc. They find particular use in paints and varnishes or in adhesives or coating compositions. Particularly, it has been noted that the products as prepared through use of oxo alcohols have the ability to be added to a wide scope of substances to impart beneficial properties thereto. These oxo esterified silica powders have excellent solubility and dispersibility properties.

The invention is hereby claimed as follows:

1. An improved method of producing a silica organosol which comprises the steps of providing a silica organosol containing colloidal silica particles as the dispersed phase and a water-miscible alcohol as the continuous phase forming and heating an admixture of said sol and an aliphatic, water-immiscible monohydric alcohol containing at least four carbon atoms whereby at least 50% by weight of said water-miscible alcohol is removed, and further heating said silica particles in the presence of said water-immiscible alcohol and an organic hydrophobic co-solvent added in an amount such that said co-solvent equals at least 15% based on the weight of the co-solvent plus the water-immiscible alcohol and having a boiling point greater than 200° C. at a temperature sufficient to cause surface esterification of said silica particles by reaction with said water-immiscible alcohol, said organic hydrophobic co-solvent being further characterized as containing no reactive groups which may interfere with the process by causing side reactions.

2. The method of claim 1 wherein said surface esterification step is run at a temperature greater than 190° C., for a period of time of at least two hours.

3. The method of claim 1 wherein said co-solvent is an organic ester.

4. The method of claim 1 wherein said co-solvent and said water-immiscible alcohol are added to said organosol prior to any heating.

5. The method of claim 1 wherein said co-solvent is added to said organosol prior to any heating.

6. The method of claim 1 wherein said water-immiscible alcohol is added to said organosol prior to any heating.

7. An improved method of producing silica organosols which comprises the steps of providing a silica organosol containing colloidal silica particles as the dispersed phase and a water-miscible alcohol as the continuous phase, adding to said organosol a mixture of an organic hydrophobic co-solvent having a boiling point greater than 200° C. and an aliphatic water-immiscible monohydric alcohol containing at least four carbon atoms to form a mixture thereof, said mixture being such that said co-solvent equals at least 15% based on the weight of the co-solvent plus the water-immiscible alcohol and heating said mixture whereby at least 50% by weight of said water-miscible alcohol is removed, said weight of water-miscible alcohol being continuously replaced by incremental additions of said mixture of water-immiscible alcohol and said co-solvent, and further heating said silica particles in the presence of said water-immiscible alcohol and said co-solvent at a temperature sufficient to cause surface-esterification of said silica particles by reaction with said water-immiscible alcohol, said organic hydrophobic co-solvent being further characterized as containing no reactive groups which may interfere with the process by causing side reactions.

8. The method of claim 7 wherein said surface-esterification step is carried out at a temperature of at least 190° C. for a period of time of at least two hours.

9. The method of claim 7 wherein said co-solvent is an organic ester.

10. An improved method of providing solid hydrophobic, organic dispersible, surface-esterified colloidal silica particles which comprises the steps of providing an organosol containing colloidal silica particles as the dispersed phase and a water-miscible alcohol as the continuous phase, forming and heating an admixture of said sol and an aliphatic water-immiscible monohydric alcohol containing at least four carbon atoms and an organic hydrophobic co-solvent added in an amount such that said co-solvent equals at least 15% based on the weight of the co-solvent plus the water-immiscible alcohol and having a boiling point greater than 200° C. whereby at least 50% by weight of said water-miscible alcohol is removed, further heating said silica particles in the presence of said water-immiscible alcohol and said co-solvent at a temperature sufficient to cause surface-esterification of said silica particles by reaction with said water-immiscible alcohol, and separating said surface-esterified silica particles from the presence of unreacted water-immiscible alcohol and co-solvent whereby a solid product is formed, said organic hydrophobic co-solvent being further characterized as containing no reactive groups which may interfere with the process by causing side reactions.

11. The method of claim 10 wherein said surface-esterification step is carried out at a temperature of at least 190° C. and for a period of time of at least two hours.

12. The method of claim 10 wherein said co-solvent is an organic ester.

13. The method of claim 10 wherein said solid product is separated from the unreacted water-immiscible alcohol and co-solvent by precipitation through addition of a water-miscible lower alkyl alcohol in an amount sufficient to effect said separation.

14. The method of claim 10 wherein at least 90% of said water-miscible alcohol is removed in 1–12 hours prior to said surface-esterification step which is carried out at a temperature range of 190–275° C. for a period of time ranging from 2 to 8 hours.

15. The method of claim 13 wherein said water-miscible alcohol is selected from the group consisting of methanol, ethanol, propanol, t-butanol, glycol ethers, and glycols, said organosol contains from 15 to 40% by weight of silica, and said precipitation of solid product is carried out by adding a weight of lower alkyl water-miscible alcohol at least equal to the weight of the sol product containing surface-esterified silica particles, unreacted water-immiscible alcohol and co-solvent to effect said separation.

16. An improved method of producing a silica organosol which comprises the steps of providing a silica organosol containing 15–40% by weight of colloidal silica particles as the dispersed phase and a water-miscible alcohol as the continuous phase, said alcohol being selected from the group consisting of methanol, propanol, ethanol, t-butanol, glycol ethers, and glycols, adding to said organosol a mixture containing 15–50% by weight of an organic hydrophobic co-solvent having a boiling point greater than 200° C. and an aliphatic water-immiscible monohydric alcohol containing at least four carbon atoms and heating the resulting mixture whereby at least 50% by weight of said water-miscible alcohol is removed, said weight of water-miscible alcohol being continuously replaced by incremental additions of said mixture of water-immiscible alcohol and said co-solvent, and further heating said particles in the presence of said water-immiscible alcohol and said co-solvent at temperatures ranging from 190° to 270° C. for a period of time ranging from 2 to 8 hours whereby surface-esterification of said silica particles is caused by reaction with said water-immiscible alcohol, said organic hydrophobic co-solvent being further characterized as containing no reactive groups which may interfere with the process by causing side reactions.

References Cited

UNITED STATES PATENTS 2,801,185   7/1957   Iler _____ 252—309 X

LEON D. ROSDOL, *Primary Examiner.*

R. D. LOVERING, *Assistant Examiner.*

UNITED STATES PATENT OFFICE
CERTIFICATE OF CORRECTION

Patent No. 3,336,235                         August 15, 1967

Morris Mindick et al.

It is hereby certified that error appears in the above numbered patent requiring correction and that the said Letters Patent should read as corrected below.

Column 7, line 13, for "its" read -- it --; line 30, for "114" read -- 1149 --.

Signed and sealed this 8th day of October 1968.

(SEAL)
Attest:

Edward M. Fletcher, Jr.
Attesting Officer

EDWARD J. BRENNER
Commissioner of Patents